Dec. 24, 1957  C. G. SONTHEIMER  2,817,810
MEASURING DEVICE
Filed Nov. 1, 1952

INVENTOR
CARL G. SONTHEIMER
BY
Curtis, Morris & Safford.
ATTORNEYS

United States Patent Office 2,817,810  
Patented Dec. 24, 1957

2,817,810

MEASURING DEVICE

Carl G. Sontheimer, Riverside, Conn., assignor to C. G. S. Laboratories, Inc., Stamford, Conn., a corporation of Connecticut Application November 1, 1952, Serial No. 319,089

4 Claims. (Cl. 324—57)

This invention is in the field of electrical impedance measurements. The invention provides for rapid measurement of impedances over a relatively wide frequency range by means of apparatus that is basically simpler and easier to operate than earlier instruments.

Bridge type networks have been the most widely used for making impedance measurements. In using such circuits it is customary to determine the unknown impedance by using a number of variable impedance standard elements to form three of the arms of a bridge, and to include the unknown impedance as the fourth arm. The values of these standard elements are varied until a null appears across the bridge, and then the unknown impedance is determined from the ratios of the standards.

However, each such bridge circuit requires a number of precisely made variable standard elements, including resistors, condensers, and inductors.

The present invention requires a smaller number of fixed impedance standards and the only variable element required can be in the form of a resistance. In a preferred embodiment of the invention, two calibrated variable resistance units and only one reactance element, preferably a condenser, are used to measure impedances over a relatively wide range of values and at widely different frequencies.

Figure 1:
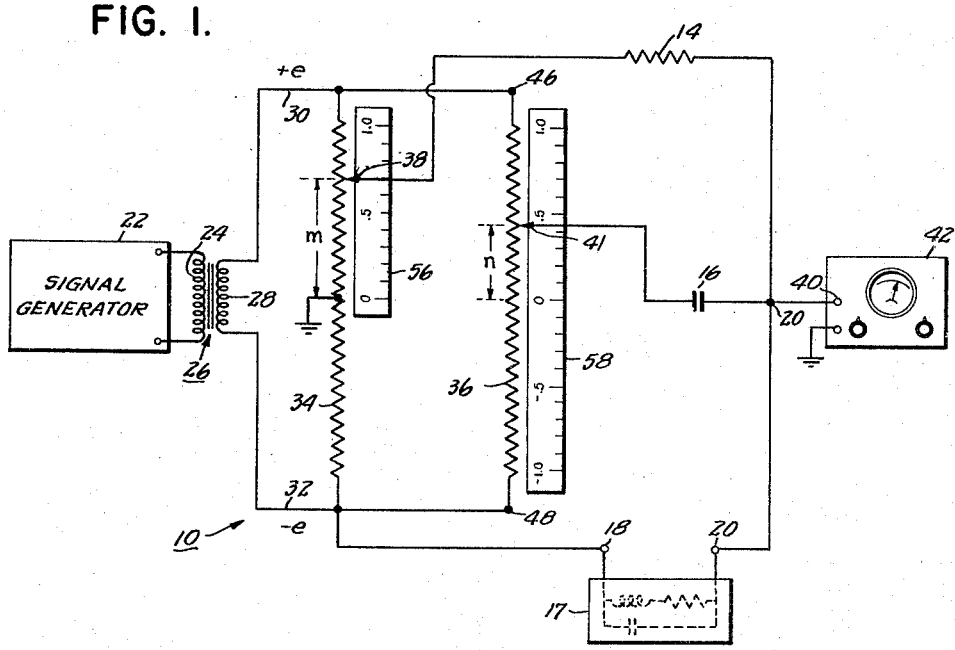
Figure 2:
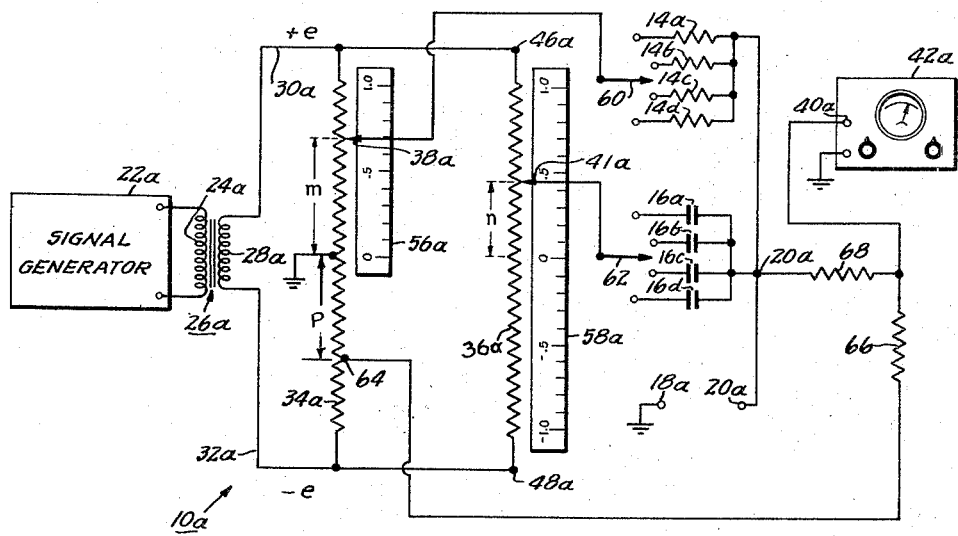

The various aspects, and advantages of the invention will be in part pointed out in and in part apparent from the following description considered in conjunction with the accompanying drawings, in which:

Figure 1 is a schematic diagram of the electrical circuits of an impedance measuring apparatus embodying the invention; and Figure 2 is a similar diagram of another embodiment of this invention.

As shown in Figure 1, the impedance measuring circuit includes a standard resistor 14 and a standard condenser 16. In using this measuring circuit, the conductance and susceptance of the unknown 17, which is connected across two terminals 18 and 20, are compared, respectively, with the conductance and susceptance of the standard elements 14 and 16.

In order to energize the circuit, alternating voltage, for example from a signal generator 22 tunable from 100 cycles to 100 kilocycles, is connected to the primary winding 24 of a transformer 26, the secondary winding 28 of which is connected by leads 30 and 32 to opposite ends of a potentiometer 34 having a mid-point tap connected to the common ground circuit.

With this arrangement, it is seen that the ends of the potentiometer 34 are at potentials "+e" and "—e," respectively (from ground) and are 180° out of phase with each other. A second potentiometer 36 is connected in parallel with the potentiometer 34. A sliding contact 38 of the potentiometer 34 is connected through the resistor 14 to the unknown impedance terminal 20 and to an input terminal 40 of an indicator 42 which may be a conventional high impedance voltmeter that is responsive to the presence of alternating voltage. The sliding contact 41 of the potentiometer 36 is connected through the standard condenser 16 to the terminal 20. The lower ends of these potentiometers are connected to the terminal 18 and through the unknown impedance to the terminal 20.

In operation, after the unknown impedance is connected between the terminals 18 and 20, the sliding contacts 38 and 41 are adjusted until a null indication is shown by the meter 42. When this adjustment has been made, the unknown impedance is determined from the known values of the standard elements 14 and 16 and the positions of the contacts 38 and 41 on their potentiometers.

Two calibrated scales 56 and 58 are provided for determining the balance position of these potentiometer contacts. For example, the scale 56 may be calibrated with values between zero and one which correspond to the relative resistance along the potentiometer 34 between ground and the upper end of the potentiometer. The other scale 58 may be calibrated between plus and minus one, the zero position corresponding to the electrical center of the potentiometer 36 and the other values corresponding to the relative resistance along the potentiometer, the positive numbers corresponding to the upper half of the potentiometer and the negative numbers corresponding to the other half of the potentiometer.

For purposes of explanation, the position of the contact 38 relative to the common ground circuit is expressed by the fraction "$m$," as shown, and similarly the position of the contact 41 relative to the midpoint of the potentiometer 36 (ground potential) to ground is expressed by the fraction "$n$." Thus, a voltage "$me$" is applied to the resistor 14, and a voltage "$ne$" is applied to condenser 16.

For highest accuracy, the voltages "$me$" and "$ne$" should be unaffected by changes in the magnitude of the unknown impedance 17. This can be accomplished by a suitable voltage regulating circuit if desired. For many applications, sufficient accuracy is obtained by the using of a transformer 26 in which the secondary winding is of low impedance and two potentiometers 34 and 36 of low resistance.

When the adjustment of the contacts 38 and 41 produces a null at the measuring point 20, the relative resistances and reactances are so related that the conductance of the unknown impedance is equal to the product of the conductance of the resistor 14 and the value "$m$" as indicated on the scale 56: the susceptance of the unknown impedance is equal to the product of the susceptance of the condenser 16 and the value of "$n$" as indicated on the scale 58.

As mentioned above, one advantage of the present invention is that both inductance and capacitance standard elements are not required. Thus, the reactance element 16 may be a condenser as shown, but nevertheless the circuit can be used to measure any unknown impedance whether it include inductive or capacitive susceptance. For instance, assuming that there is capacitive susceptance between the terminals 18 and 20, then with a condenser being used for the standard reactance element 16, the position of the contact 41 will be between the center and the upper end of the potentiometer, that is upon that potrion of the scale 58 having positive calibration values. With an inductive susceptance between the terminals 18 and 20, the contact 41 will be positioned at balance along the negative portion of the scale 58.

If the condenser 16 were replaced by an inductor, then the corresponding indications on the "$n$" scale would be reversed so far as positive and negative values are concerned. For most applications, the use of a capacitive standard is to be preferred.

It will be noted also that the resistor 14 and the condenser 16 are fixed in value and that the potentiometers 34 and 36 are the only variable elements. These potentiometers can be calibrated readily in terms of a linear scale, thus providing an accurate and relatively inexpensive instrument.

In the circuit of Figure 1, the unknown impedance 17 is ungrounded. In some instances, it is desired or necessary that one terminal of the unknown impedance be connected to the common ground terminal. Such a circuit arrangement is shown in Figure 2.

The circuit of Figure 2 is generally similar to the circuit of Figure 1 and operates on the same fundamental principles. In order to simplify the description, certain of the parts of Figure 2 are indicated by the same reference numerals, followed by the suffix "a," as in Figure 1 where the parts are similar and perform corresponding functions.

As in Figure 1, the alternating voltage from the oscillator 22a is applied through the transformer 26a to opposite ends of the parallel-connected potentiometers 34a and 36a. In order to extend the operating range of the instrument, the resistance standard now comprises four standard resistance elements of different values indicated respectively at 14a, 14b, 14c, and 14d. These resistors are arranged so that any one of them can be connected into the circuit by means of a switch 60. In order to extend the range over which susceptance can be measured accurately, a number of standard condensers of different sizes, indicated respectively at 16a, 16b, 16c, and 16d, are arranged so that any one of them can be connected into the circuit by means of a switch 62.

In this example, the unknown impedance terminal 18a is connected to the common ground circuit, that is to the center tap of the potentiometer 34a. A suitable comparison voltage is obtained from the lower half of the potentiometer 34a by a tap connection 64 located at the relative position "p" from the center-tap. Thus, a comparison voltage "—pe" is connected through two series isolation resistors 66 and 68 to the measuring point 20a. These resistors should be sufficiently high in resistance that the voltage appearing at the tap 64 will have no significant effect on the voltage appearing at the measuring point 20a, and they may be equal in value. The null indicator 42a is connected to the junction of the resistors 66 and 68.

In operation, the potentiometer contacts 38a and 41a are adjusted until a null is indicated by the meter 42a. When this null is reached the measuring point 20a is at the same magnitude of positive potential as the magnitude of the negative comparison potential supplied by the tap 64, that is, the point 20a is at "+pe" volts.

The unknown conductance "$g_x$" and the unknown susceptance "$b_x$" connected between the terminals 18a and 20a can be determined as follows:

$$g_x = \left(\frac{m-p}{p}\right)g$$

$$b_x = \left(\frac{n-p}{p}\right)b$$

where "$g$" and "$b$" are the conductance and susceptance of the standard elements 14a and 16a.

I have found that a satisfactory comparison voltage is obtained by locating the tap 64 mid-way between the center-tap connection and one end of the potentiometer 34a, to provide a value of "$-e/2$." The equations, above, for balance condition of this circuit become as follows:

$$g_x = (2m-1)g$$

$$b_x = (2n-1)b$$

From these equations it will be seen that balance condition will always be attained with the voltage at potentiometer contact 38a between $$\frac{\text{``}e\text{''}}{2}$$

and "$e$" volts; and the voltage at the other potentiometer contact 40a between ground and "$e$" volts.

It will be apparent that suitable scales calibrated to indicate directly the resistance and reactance of the unknown impedance can be provided and that the switches 60 and 62 can be ganged with suitable scale-changing mechanisms to provide a convenient, accurate, direct-reading, wide-range instrument.

From the foregoing, it is apparent that the impedance measuring device embodying my invention is well suited to attain the ends and objects herein set forth and that it is relatively simple and inexpensive in comparison with other measuring instruments used heretofore. Certain portions of the described circuits may be used at times to advantage without a corresponding use of other parts of the circuit. It will be apparent also that many modifications of the apparatus will be made to best suit it to each particular application and that such modifications may be made without exceeding the scope of my invention.

I claim:

1. An impedance measuring circuit comprising first, second, and third circuit arms connected to a common measuring circuit, said first arm including a resistance standard element, said second arm including a reactance standard element, said third arm including a pair of measuring terminals between which an unknown impedance element can be connected, one of said measuring terminals being connected to said measuring circuit, a common ground circuit, a generator of alternating voltage of controllable frequency having first and second terminals supplying alternating voltage of opposite phase with respect to said ground circuit, first and second potentiometers connected between said supply terminals, the first potentiometer having a centertap connected to the common ground circuit, a first adjustable contact on said first potentiometer and being connected to said first arm, a second adjustable contact on said second potentiometer and being connected to said second arm, means connecting said third arm to the common ground circuit, and an alternating voltage sensing means connected to said common measuring circuit.

2. An impedance measuring circuit comprising first, second, and third circuit arms connected to a common measuring circuit, said first arm including a resistance standard element, said second arm including a reactance standard element, said third arm including a pair of measuring terminals between which an unknown impedance element can be connected, one of said measuring terminals being connected to said measuring circuit, a common ground circuit, a generator of alternating voltage of controllable frequency having first and second terminals supplying alternating voltage of opposite phase with respect to said ground circuit, first and second potentiometers connected between said supply terminals, the first potentiometer having a centertap connected to the common ground circuit, a first adjustable contact on said first potentiometer and being connected to said first arm, a second adjustable contact on said second potentiometer and being connected to said second arm, means connecting said third arm to one of said generator terminals, and an alternating voltage sensing means connected to said common measuring circuit.

3. An impedance measuring circuit comprising first and second circuit arms connected to a measuring circuit, said first arm including a resistance standard element, said second arm including a reactance standard element, a third arm including a pair of measuring terminals between which an unknown impedance element can be connected, circuit means coupling one of said measuring terminals to said measuring circuit, a common ground circuit, a generator of alternating voltage of controllable frequency having first and second terminals supplying alternating voltage of opposite phase with respect to said ground circuit, first and second potentiometers connected between said supply terminals, the first potentiometer having a centertap connected to the common ground circuit, a first adjustable contact on said first potentiometer movable between the centertap and the end of the potentiometer connected to said first generator terminal, said adjustable contact being connected to said first arm, a second adjustable contact on said second potentiometer and being connected to said second arm, means connecting said third arm to one of said generator terminals, a fixed tap on said first potentiometer between the centertap and the end of the potentiometer connected to said second generator terminal, a series resistance circuit connected between said fixed tap and said common ground circuit, and an alternating voltage sensing means coupled between said measuring circuit and a portion of said series resistance circuit.

4. An impedance measuring circuit comprising first, second, and third circuit arms connected to a measuring circuit, said first arm including a resistance standard element, said second arm including a reactance standard element, said third arm including a pair of measuring terminals between which an unknown impedance element can be connected, circuit means coupling one of said measuring terminals to said measuring circuit, a common ground circuit, a generator of alternating voltage of controllable frequency having first and second terminals supplying alternating voltage of opposite phase with respect to said ground circuit, first and second potentiometers connected between said supply terminals, the first potentiometer having an adjustable contact movable between the centertap and the end of the potentiometer connected to said first generator terminal, said adjustable contact being connected to said first arm, a second adjustable contact on said second potentiometer and being connected to said second arm, means connecting said third arm to one of said generator terminals, a fixed tap on said first potentiometer between the centertap and the end of the potentiometer connected to said second generator terminal, a series resistance circuit having a centertap and being connected between said fixed tap and said common ground circuit, and an alternating voltage sensing means coupled between said measuring circuit and the centertap in said series resistance circuit.

References Cited in the file of this patent

UNITED STATES PATENTS

| | | |
|---|---|---|
| 1,397,228 | Nyquist | Nov. 15, 1921 |
| 2,551,337 | Roberts | May 1, 1951 |
| 2,595,297 | Relis | May 6, 1952 |
| 2,617,857 | Secker | Nov. 11, 1952 |